SELECTIVE TELEPHONIC MUSIC DISTRIBUTING SYSTEM AND APPARATUS

Filed March 5, 1949 6 Sheets-Sheet 1

INVENTOR
GEORGE PORTER ELLIS
BY
Fetherstonhaugh & Co
ATTORNEYS

Feb. 19, 1952 G. P. ELLIS 2,586,213

SELECTIVE TELEPHONIC MUSIC DISTRIBUTING SYSTEM AND APPARATUS

Filed March 5, 1949 6 Sheets-Sheet 2

INVENTOR
GEORGE PORTER ELLIS
BY
Fetherstonhaugh & Co.
ATTORNEYS

INVENTOR
GEORGE PORTER ELLIS
BY
Fetherstonhaugh & Co.
ATTORNEYS

Feb. 19, 1952 G. P. ELLIS 2,586,213

SELECTIVE TELEPHONIC MUSIC DISTRIBUTING SYSTEM AND APPARATUS

Filed March 5, 1949 6 Sheets-Sheet 4

INVENTOR
GEORGE PORTER ELLIS
BY
Fetherstonhaugh & Co.
ATTORNEYS

Feb. 19, 1952 G. P. ELLIS 2,586,213

SELECTIVE TELEPHONIC MUSIC DISTRIBUTING SYSTEM AND APPARATUS

Filed March 5, 1949 6 Sheets-Sheet 5

INVENTOR
GEORGE PORTER ELLIS
BY
Fetherstonhaugh & Co
ATTORNEYS

INVENTOR
GEORGE PORTER ELLIS
BY
Fetherstonhaugh & Co
ATTORNEYS

Patented Feb. 19, 1952 2,586,213

UNITED STATES PATENT OFFICE 2,586,213

SELECTIVE TELEPHONIC MUSIC DISTRIBUTING SYSTEM AND APPARATUS

George Porter Ellis, Vancouver, British Columbia, Canada

Application March 5, 1949, Serial No. 79,886

12 Claims. (Cl. 179—6.3)

Figures 1, 2:
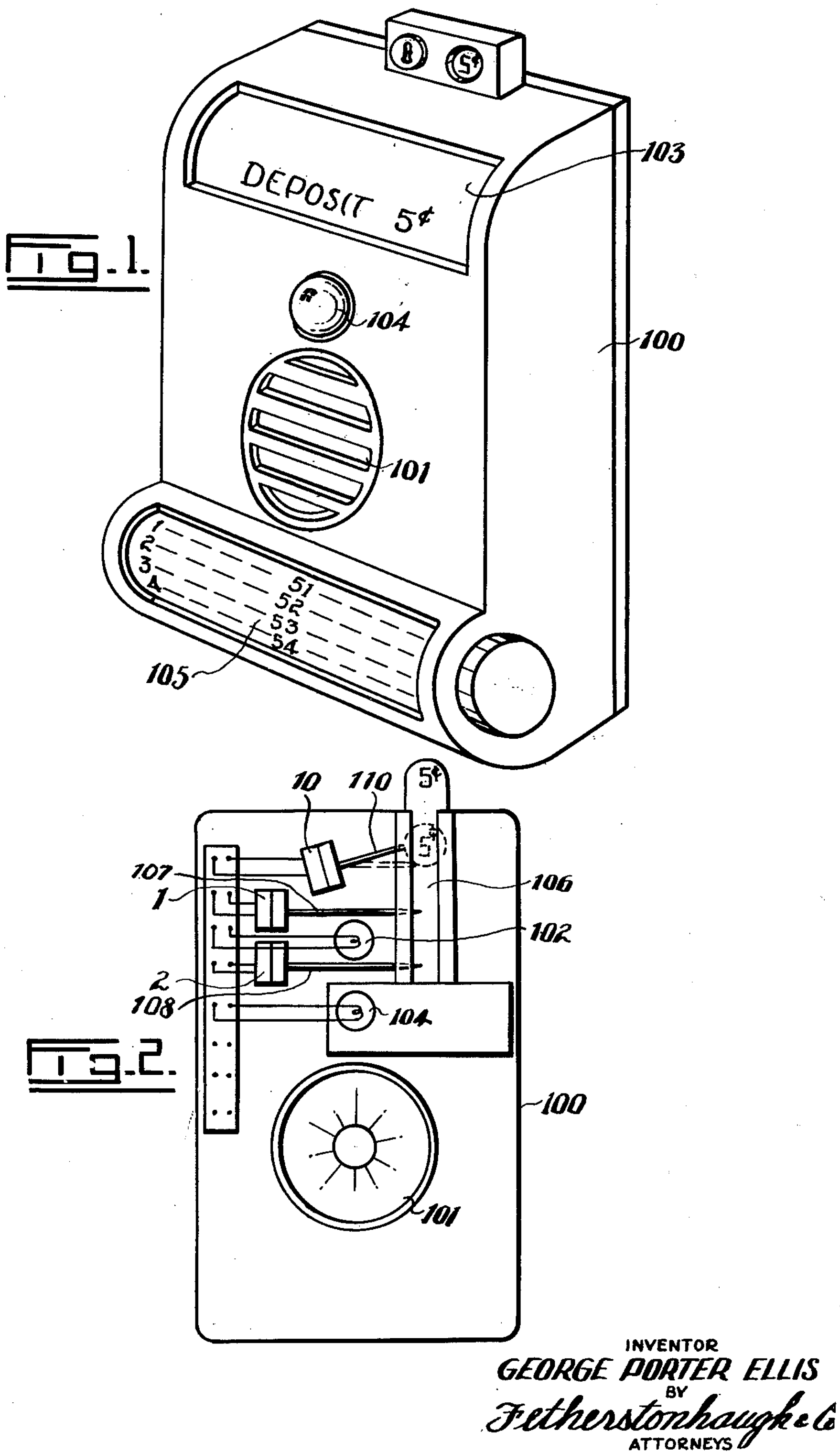

This invention relates to a system and apparatus for distributing music from a central station to any one of a plurality of remote stations, each having a plurality of call boxes, one only of which may be in use at a time.

The main object of this invention is the provision of a system for selectively distributing music from a central station to a plurality of remote stations, and as the remote stations are all the same, one only will be described herein in detail. The remote station has a plurality of individual call boxes located at various points, and an amplifier for the music. This invention makes it possible to have the plurality of individual coin-controlled call boxes, through any one of which a person may communicate with an operator at the central station. When a person inserts a coin of the proper denomination into his call box, he is brought into communication with the station operator, and at the same time, the other call boxes at the remote station are disconnected from the central station, and suitable means is provided for preventing a coin from attempting to operate any of the disconnected boxes at this time. Busy lights are also flashed to indicate when the call boxes are inoperative. An important feature of this invention lies in the fact that all this can be accomplished by the use of a telephone line between the central and remote stations. This acts as one side of a circuit, and the ground acts as the other side thereof. Of course, another telephone wire could be used in this circuit instead of the ground.

Other features of this invention are the use of electronic tubes for controlling the microphone-speakers at the remote station, and for clearing the call boxes at said station; the fact that D. C. voltage only is used over the telephone line, thereby eliminating any chance of hum; the fact that music being played over the telephone line does not interfere with voices between a call box and the central station, nor does the music interfere with the talk-listen circuit; and normally no voice comes over the music speakers.

The remote station is usually in a public place, such as a restaurant, where the individual call boxes are spaced along a counter or located at different tables. A loud-speaker for the music is located at a convenient point in the public place. Each call box is provided with a list of numbered musical selections which are available. These boxes are coin-controlled. When a person desires to hear a certain musical selection, he can communicate with the operator at the central station regardless of whether or not music is coming over the loud-speaker. When the person inserts a coin of the required denomination into his box, a signal light goes on at the central station to indicate to the operator that someone is calling, and the transaction is automatically recorded in the usual manner. At the same time, a microphone-speaker in the call box is put into circuit, while the ordinary lights of the call boxes at that remote station are turned off and busy lights turned on in order to stop others from inserting coins in their boxes at that time. A coin-holding arm is operated in each of the boxes, other than the one in play, to prevent any coin which may be inserted in these boxes from moving along the coin chute. The busy light and the coin-holding arm of the box in play are not operated at this time.

When the operator sees the signal light, she moves a station key downwardly to bring her microphone-speaker into operation so that she can hear anything spoken into the microphone-speaker in the call box. She then moves a talk-listen key downwardly which reverses both microphone-speakers so that she can ask for the desired number. The talk-listen key is immediately returned to its normal position, at which time the person can ask for the number he desires. The operator now raises the talk-listen key to cut off the box in play and to turn off the busy lights and turn on the ordinary lights, and remove the coin-holding arms from the chutes of the other boxes. Suitable means is provided for doing this instantaneously regardless of the speed with which the talk-listen key is returned to its normal position. The reason for this is to eliminate the possibility of a coin which might be resting on a coin-holding arm from dropping into its box without putting it into operation.

Figure 3:
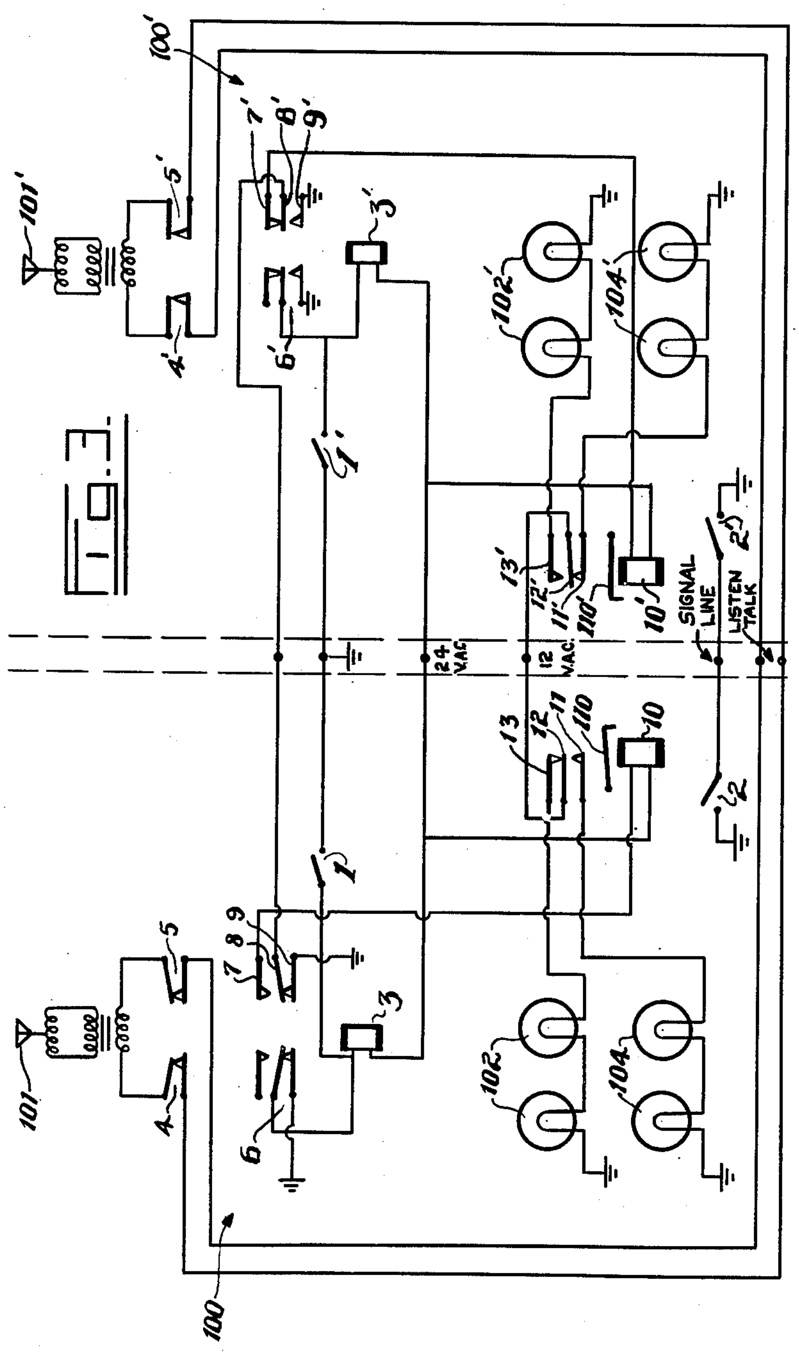
Figure 4:
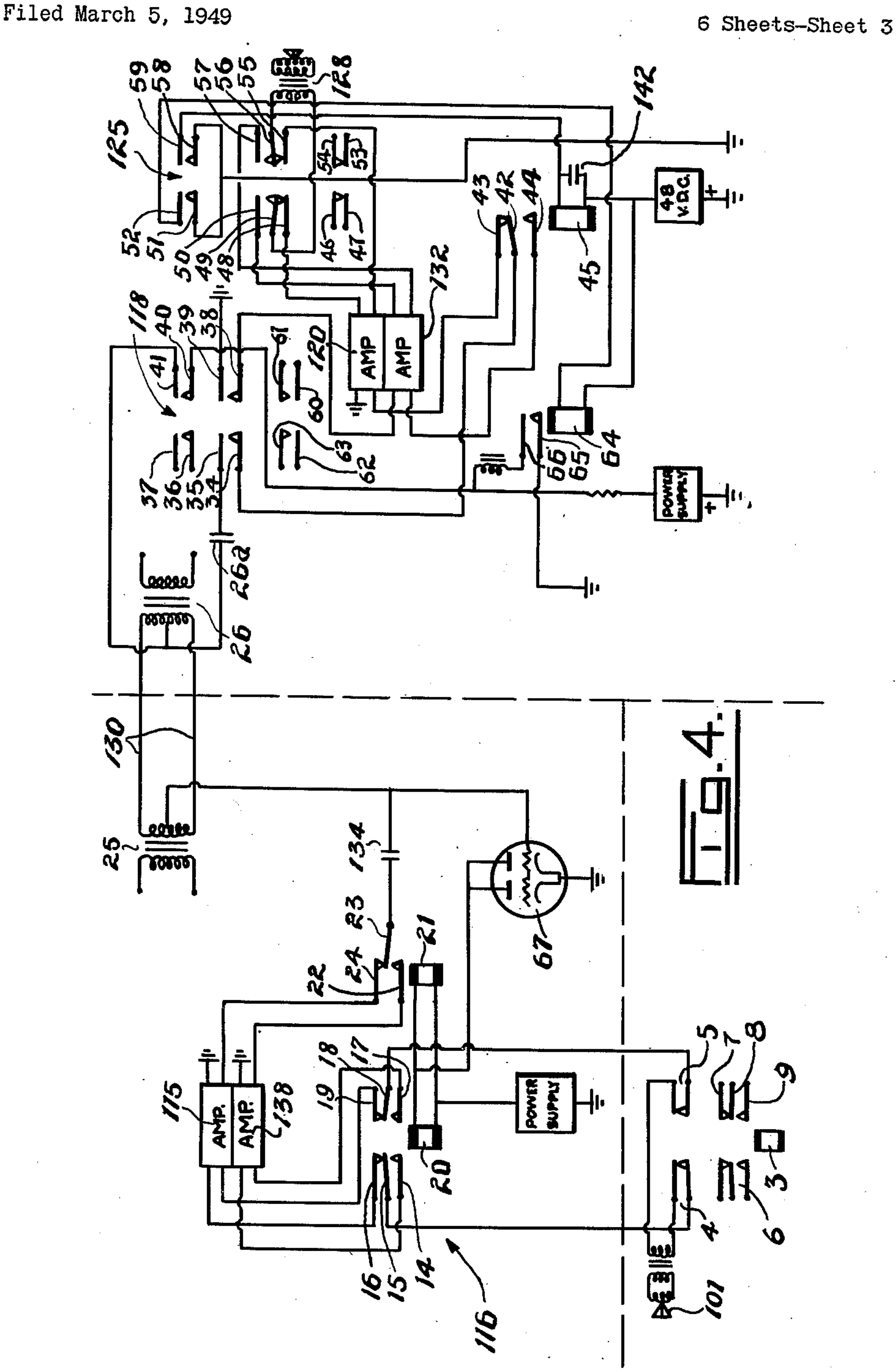
Figure 5:
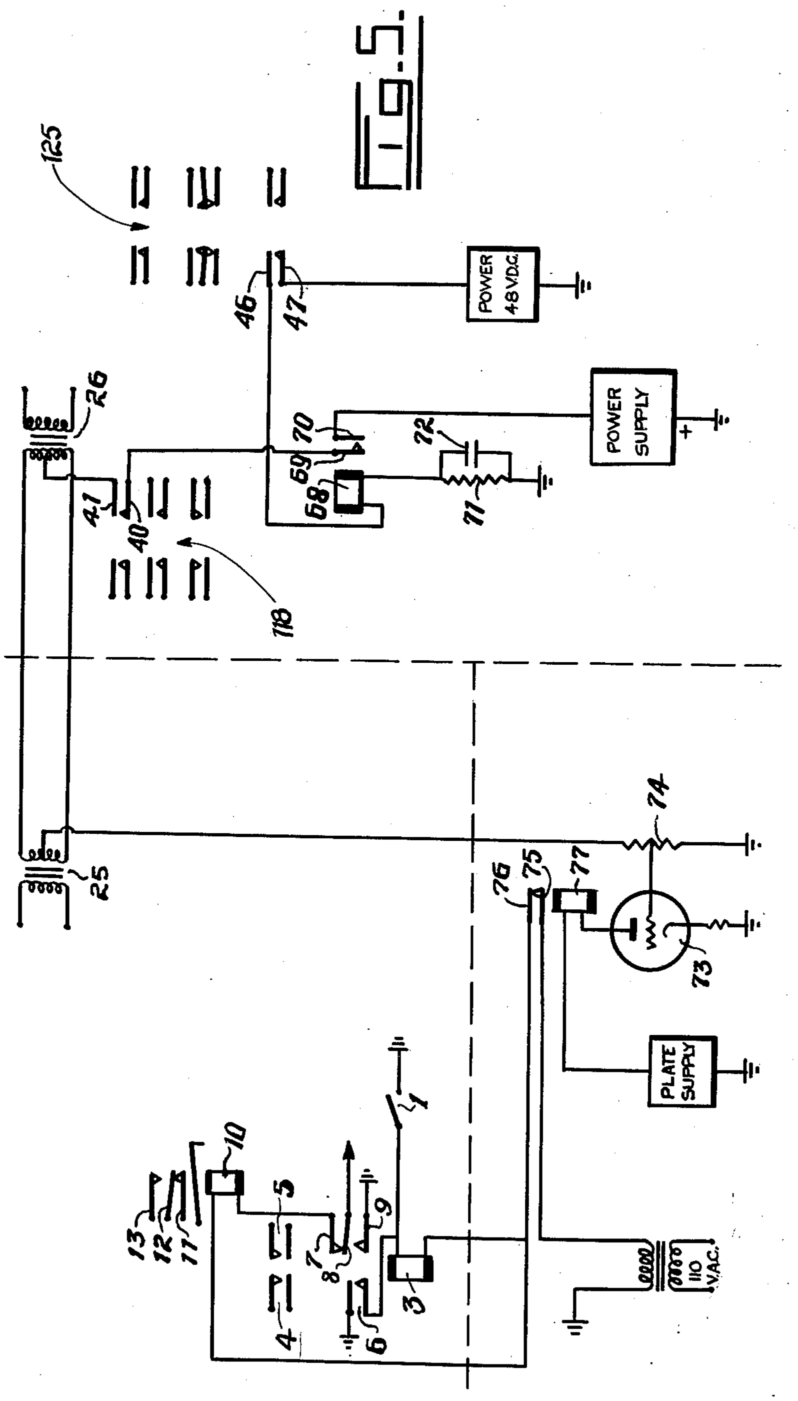
Figure 6:
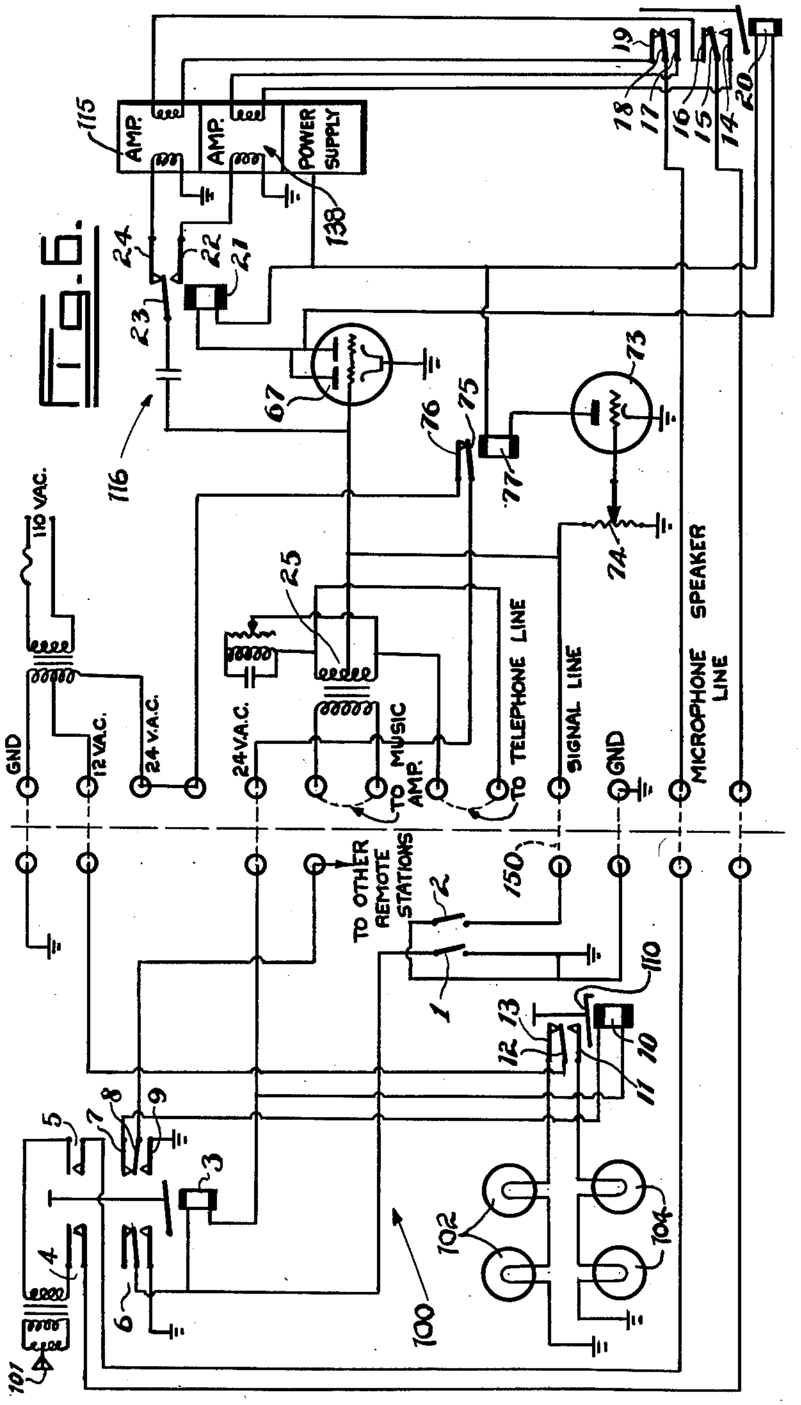
Figure 7:
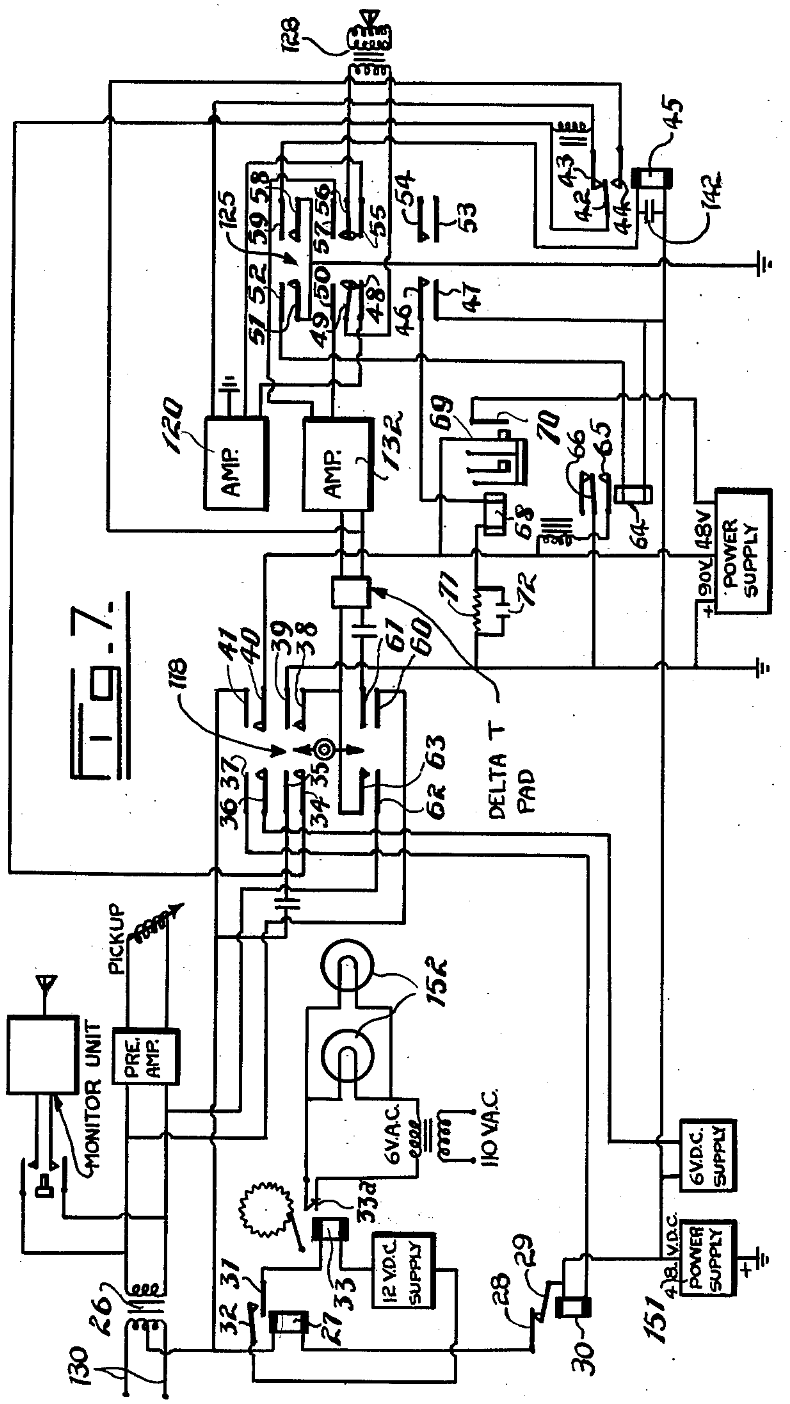

An example of this system is illustrated in the accompanying drawings, in which, Figure 1 is a perspective view of a remote station call box, Figure 2 diagrammatically illustrates the interior of a call box, showing only the parts thereof which are pertinent to this invention, Figure 3 is a wiring diagram of two call boxes at a remote station, one of which is in play, Figure 4 is a wiring diagram of the control unit of a remote station connected to the central station, with the station and talk-listen keys of the latter down, Figure 5 is a wiring diagram similar to Figure 4 with the talk-listen key in the up or clearing position, Figure 6 is a complete wiring diagram of a remote station showing its control unit and one call box, and Figure 7 is a complete wiring diagram of the central station.

Figures 1 and 2 show a call box 100 having a microphone-speaker 101, an ordinary light 102 which may be seen through a window 103, a busy light 104, and a roll 105 which includes the names of a plurality of musical selections, each of which is numbered. The box also has a coin chute 106 into which operating arms 107 and 108 of switches 1 and 2 project. A coin-holding arm 110 is located near this chute and may be selectively moved thereinto by a relay 10.

When a coin is inserted in the chute 106, it drops down and moves the arms 107 and 108 momentarily to close the switches 1 and 2. If the holding arm 110 is moved into the chute before a coin is inserted therein, it will prevent the coin from operating the switches 1 and 2.

For the sake of clarity, the operation of the circuits in the apparatus will be described in three stages illustrated in Figures 3, 4 and 5, respectively. The combined circuits are illustrated in Figures 6 and 7. As there is a talk and a listen amplifier in the control unit of each remote station and in the central station, these will hereinafter be referred to in relation to operator at the central station. The amplifiers designated as listen amplifiers in the control unit and at the central station will mean those which are in operation when the operator is listening, while those designated as talking amplifiers will be those in operation when the operator is talking.

Figure 3 is a wiring diagram of two call boxes of a remote station, the one at the left of this figure being in play, that is, a coin has been inserted in the chute and the switches 1 and 2 have been closed momentarily. Switch 2 turns on a signal light and operates a recording mechanism at the central station in the usual manner.

When the switch 1 is closed, a 24 v. A. C. which is connected to a relay 3 is grounded to operate said relay. This closes the contacts designated at 6 to keep the relay grounded. At the same time, contacts 7—8 are opened and contacts 8—9 are closed. Relay 3 also closes contacts 4 and 5, to bring the microphone-speaker 101 into circuit. When 7—8 open, the relay 10 of the call box in play is cut out, and when 8—9 close, the relays 10' of all the other call boxes are energized. Each relay 10' moves a holding arm 110' into its coin chute 106' so that a coin cannot put that call box into operation while another one is in play. Each relay 10' opens the contacts 13'—12' and closes the contacts 12'—11'. This cuts out the ordinary lights 102' and turns on the busy lights 104'. As the relay 10 of the box in play has been cut out, the ordinary lights 102 remain on and the busy lights 104 remain off in this box.

From this it will be seen that a coin inserted in one call box cuts off the ordinary lights and turns on the busy lights of all the other boxes at that remote station, and operates the coin-holding arms in the other boxes to prevent any of the latter from being put into operation while the first box is in play. The microphone-speaker of the box in play is in circuit, and a signal light at the central station is turned on.

By referring to Figure 4, it will be seen that when the contacts 4 and 5 are closed, the microphone-speaker 101 is connected to the listen amplifier 115 through the closed contacts 15—16 and 18—19. This amplifier is located in a control unit 116 of the remote station. When the operator sees the signal light, she presses down a station key 118 to close contacts 36—37, 34—35, 40—41, and 38—39. The closed contacts 34—35 connect the centre tap of a line-to-line transformer 26 through a condenser 26a to a contact 42 of a relay 45. This contact normally engages a contact 43 which is connected to the input of a listen amplifier 120 in the central station, the output of said amplifier being connected to the contacts 48 and 55 of a talk-listen key 125. The contacts 48 and 55 normally engage contacts 49 and 56 respectively, thus connecting a microphone-speaker 128 in the central station with the amplifier 120.

When contacts 36—37 are closed, this removes a 48 v. D. C. from telephone line 130 which extends from the central station to the remote station, as hereinafter described.

When contacts 40—41 close, the 48 v. D. C. on the telephone line is replaced by a lower voltage which may be about 25 v. D. C. The closed contacts 38 and 39 ground one side of a talk amplifier 132 at the central station.

One side of the listen amplifier 115 of the control unit is grounded, while the other side thereof is connected to a contact 24 of a relay 21, said contact normally engaging a contact 23. The latter contact is connected through a condenser 134 to the centre tap of a line-to-line transformer 25 in the control unit. It will be noted that the telephone line 130 extends between the transformers 25 and 26 of the control unit and central station, respectively.

By following the circuits just described, it will be seen that the microphone-speaker 101 is connected through the listen amplifiers 115 and 120 to the microphone-speaker 128 so that the operator at the central station can hear anything spoken into the microphone-speaker of the call box at the remote station.

As the operator now desires to ask the person at the call box for the number of the musical selection to be played, she presses down the talk-listen key 125. This closes contacts 51—52, 58—59, 50—49, and 57—56, and breaks contacts 49—48, and 55—56. When contacts 51—52 closed, a relay 64 is energized to close contacts 65—66. This grounds out the voltage applied to the telephone line through contacts 40—41 of the station key, thus removing the voltage applied to the grid of an electronic tube 67 in the control unit of the remote station. This allows current to flow through the tube, and as relays 20 and 21 are in circuit with the tube, these are energized. Relay 20 opens contacts 15—16, and 18—19, and closes contacts 14—15, and 17—18, while the relay 21 opens contacts 23—24, and closes contacts 22—23. Thus, the talk amplifier 138 of the control unit replaces the listen amplifier 115 in the circuit.

The closing of contacts 58—59 energizes a relay 45 which opens contacts 42—43 and closes 42—44. This changes over the input of the listen amplifier 120 to the output of the talk amplifier 132. When the contacts 50—49, and 57—56 are closed, and the contacts 48—49, and 55—56 are opened, this changes over the microphone-speaker 128 from the output of the listen amplifier 120 to the input of the talk amplifier 132.

At this time, the microphone-speaker 128 is connected through the talk amplifiers 132 and 138 to the microphone-speaker 101, so that the operator may now ask for the number of the selection to be played. As soon as the question is asked, the operator returns the talk-listen key 125 to its normal position, at which time the circuit is changed so that she can hear what the person at the microphone-speaker 101 says.

From the above, it will be seen that the talk and listen circuits are completely separate, and as each individual talk and listen amplifier is completely cut out when it is not required, there can be no feedback. The relay 45 is shunted by a condenser 142, so that said relay operates quickly and when the voltage is cut off, there is a delayed action, thus eliminating any click in the microphone-speaker 128.

The operator is now ready to clear the call boxes at the remote station, that is, she wishes to cut off the call box in play and to restore the remaining call boxes to their normal condition. This is done by raising the talk-listen key 125. The clearing action must be done instantly in order that a coin which may be held by a holding arm 110 in a call box will not drop past the switch arms 107 and 108 before the clearing action has been completed.

When the operator raises the talk-listen key 125 to the clearing position, contacts 46—47 are closed and this applies a D. C. voltage to a relay 68 which is in series with a time-constant resistor 71 and condenser 72, see Figure 5. Sufficient current flows through the relay 68 to operate it momentarily to close contacts 69—70 for an instant. As the condenser 72 becomes charged, the voltage drop across relay 68 is not sufficient to keep it closed. The closing of contacts 69—70 applies a relatively high voltage through closed contacts 40—41 to the centre tap of the transformer 26. The grid of an electronic tube 73 in the control unit of the remote station (see Figure 6) is connected to a centre tap of a variable resistor 74 which, in turn, is connected to the centre tap of the transformer 25. The tube 73 is so biased that current flows therethrough until a relative high voltage, e. g. 90 v. D. C., is applied to its grid. When the contacts 69—70 are closed, as described, the relatively high voltage is applied to the grid of the tube 73 to stop current normally flowing through said tube. This de-energizes a relay 77 momentarily to open contacts 75—76. This disconnects the 24 v. A. C. from relay 3, causing contact 6 to open so that said relay remains de-energized. Contacts 4 and 5 open and the microphone-speaker 101 is taken out of circuit. Contacts 8—9 also open so that the relays 10′ of all the call boxes not in play are de-energized. This removes the holding arms 110 from the coin chutes, and it turns out the busy lights 104′, and turns on ordinary lights 102′.

The operator can at any time after receiving the chosen number play the musical selection which comes over the loud-speaker in the public place in the usual manner, while the call boxes are all ready for operation and may be used even while the music is being played.

Figure 6 is a wiring diagram of a control unit and one call box at the remote station, and Figure 7 is a complete wiring diagram of the central station. Summing this matter up, when a coin is inserted in a call box 100, the switches 1 and 2 are closed momentarily. When the switch 2 closes, this connects the signal line 150 to ground, the opposite end of which is connected to the transformer 25 in the control unit 116. The centre tap of the transformer 26 at the central station is connected to a relay 27 which is in circuit with a power supply 151 (see Figure 7). Normally closed contacts 28—29 are in the circuit between the relay 27 and the power supply, and these contacts are controlled by a relay 30. When relay 27 is energized, contacts 31—32 are closed to cause a stepping relay 33 to operate. At the same time, the stepping relay closes contacts 33a to operate signal lights 152 on a switchboard. Thus, each time a coin is inserted in a call box, the stepping relay operates to register the transaction in the usual manner, and the signal lights 152 at the switchboard go on.

At the same time, switch 1 operates the relay of the call box in play which, in turn, disconnects its own relay 10 and energizes the relays 10′ of the other boxes at the remote station. This connects the microphone-speaker 101 of the call box to the input of the listen amplifier 115. The relays 10′ cut off the ordinary lights 102′ and turn on the busy lights 104′ of their respective boxes. This also moves the coin-holding arms 110′ to positions in their boxes which will prevent any coins inserted therein from reaching the switches 1 and 2. One side of the output of the listen amplifier 115 is connected to ground, and the other side thereof is connected to the centre tap of the line-to-line transformer 25. Telephone line 130 connects this transformer to the line-to-line transformer 26 at the central station.

When the operator at the central station sees the signal light 152 go on, she moves the station key 118 into the down position. This connects the central tap of the transformer 26 through a condenser 26a (see Figure 4) to one side of the input of the listen amplifier 120, the other side of said input being grounded. The output of this amplifier is at this time connected to the central station microphone-speaker 128. The operator can then hear anything spoken into the microphone speaker 101 of the call box in play.

Referring again to Figure 7, the downward movement of the station key 118 closes contacts 36—37, thus operating relay 30 to open contacts 28—29. This removes the 48 v. D. C. from the telephone line. However, contacts 40—41 of the station key are closed, and a lower voltage of approximately 25 v. D. C. is applied to the line. The closed contacts 38—39 ground one side of the talk amplifier 132.

Should the operator desire to make some announcement over the loud-speaker at the remote station, she moves the station key into the up position to close contacts 60—61, and 62—63. This connects the output of the talk amplifier 132 to the transformer 26, which is connected by the telephone line and transformer 25 to the loud-speaker. This part of the system is not normally used very often.

When the operator desires to speak to the person at the call box in play, while the station key is down, she moves the talk-listen key 125 down. This disconnects the microphone-speaker 128 from the output of the listen amplifier 120 and connects it to the input of the talk amplifier 132. The closing of contacts 58—59 of the talk-listen key operates the relay 45 to disconnect the input of the listen amplifier from and connects the output of the talk amplifier to the centre tap of the transformer 26.

At the same time, the relay 64 is operated to close contacts 65—66, and this removes any voltage from the telephone line. Thus, the voltage is cut off from the grids of the tube 67 to permit current to flow therethrough to operate relays 20 and 21. Relay 20 switches the microphone-speaker 101 from the input of the listen amplifier 115 to the output of the talk amplifier 138. Relay 21 cuts off one side of the output of the listen amplifier from and connects one side of the input of the talk amplifier to the centre tap of the transformer 25. The operator may now ask for the number of the musical selection to be played.

By returning the talk-listen key 125 to its normal position, she can hear the number spoken into the microphone-speaker 101.

The operator is now ready to clear the call boxes at the remote station, and this is done by raising the talk-listen key to the up position. This applies a voltage to relay 68 through resistor 71 and condenser 72 to close contacts 69—70. This applies a relatively high voltage (approximately 90 v. D. C.) to the telephone line. Thus, a relatively high voltage is applied to the grid of the tube 73, said tube being so biased that current will flow therethrough until this voltage is applied to its grid. This opens contacts 75—76 to de-energize the relay 3 of the call box in play. This cuts the microphone-speaker 101 out of circuit, and it de-energizes all the relays 10′ of the other call boxes at that remote station to turn off the busy lights 104′ and to turn on ordinary lights 102′. At the same time, the coin-holding arms 110′ are moved so that coins may be inserted in these call boxes.

The time constant resistor 71 and condenser 72 are necessary in order that the clearing action takes place in an instant, regardless of the speed with which the talk-listen key is returned to its normal position. The reason for this is that a coin might be held by one of the holding arms 110′ and the clearing must be completed and everything restored to its normal condition before the coin released by the holding arm operates switches 1 and 2. Furthermore, it is desirable to have the system in an inoperative condition, which is the case during the clearing action, for the least possible time.

What I claim as my invention is:

1. In a selective telephonic music distributing system, a central station and at least one remote station, a control unit in the remote station, a two conductor telephone line extending from the control unit to the central station, a line-to-line transformer at each end of the telephone line, means for normally maintaining a D. C. voltage between the telephone line and ground, means at the remote station for temporarily grounding the telephone line thereby causing current flow due to said D. C. voltage, signal means at the central station operative by said current flow, a music pick-up at the central station connected to its transformer, a loud-speaker at the remote station connected to its transformer, a pair of listen and talk amplifiers in the central station and in the control unit, means grounding each amplifier, a plurality of coin-operated call boxes at the remote station connected to the control unit, a microphone-speaker in each box and in the central station, means in each box operated by a coin inserted in the latter for connecting its microphone-speaker to the listen amplifier of the control unit, means connecting said amplifier to the unit transformer, a station key at the central station adapted to be operated to connect its microphone-speaker to the listen amplifier of said station and to connect the latter to the telephone line, and means in the control unit operated from the central station for switching the call box microphone-speaker over from the listen amplifier to the talk amplifier and to connect the latter to the unit transformer and disconnect the listen amplifier from said line.

2. Apparatus according to claim 1 including means for changing over the listen and talk amplifiers comprising two relays, contacts operated by one relay for changing the call box microphone speaker over from the listen to the talk amplifier, contacts operated by the other relay to disconnect the listen amplifier from and connect the talk amplifier to the control unit amplifier, an electronic tube in circuit with each of said relays, means connecting the grid of said tube to the control unit transformer whereby the D. C. voltage from the telephone line is normally applied to the grid to prevent current from flowing through the relays, and means in the central station for selectively cutting off the voltage from the line to permit the relays to operate.

3. Apparatus according to claim 1 including means for changing over the listen and talk amplifiers comprising two relays, contacts operated by one relay for changing the call box microphone-speaker over from the listen to the talk amplifier, contacts operated by the other relay to disconnect the listen amplifier from and connect the talk amplifier to the control unit amplifier, an electronic tube in circuit with each of said relays, means connecting the grid of said tube to the control unit transformer whereby the D. C. voltage from the telephone line is normally applied to the grid to prevent current from flowing through the relays, and means in the central station for selectively cutting off the voltage from the line to permit the relays to operate, and means in the central station for switching over its microphone-speaker from the listen to the talk amplifier and for disconnecting the telephone line from the former and connecting it to the latter.

4. In a selective telephonic music distributing system, a central station and at least one remote station, a control unit in the remote station, a two-conductor telephone line connecting the control unit and the central station, a plurality of coin-operated call boxes connected to the control unit, a loud-speaker connected to the control unit, a microphone-speaker in each box, a microphone-speaker at the central station, a talk-listen circuit between the control unit and the central station microphone-speaker including the telephone line in one side and a ground return in the other, a signalling circuit from the control unit to the central station including the telephone line in one side and a ground return in the other, a music circuit from said loud-speaker to the central station including a conductor of the telephone line for each of its sides, a relay in each box, means for energizing each relay when a coin is inserted in its box, a coin holding arm in each box adapted to be moved to prevent a coin from operating said box, a second relay in each box for moving the holding arm therein, and means in each box controlled by the energized first relay thereof for energizing the second relays of the other boxes to move their holding arms to render them inoperative.

5. In a selective telephonic music distributing system, a central station and at least one remote station, a control unit in the remote station, a two conductor telephone line connecting the control unit and the central station, a plurality of coin-operated call boxes connected to the control unit, a loud-speaker connected to the control unit, a microphone-speaker in each box, a microphone-speaker at the central station, a talk-listen circuit between the control unit and the central station microphone-speaker including the telephone line in one side and a ground return in the other, a signalling circuit from the control unit to the central station including the telephone line in one side and a ground return in the other, a music circuit from said loud-speaker to the central station including a conductor of the telephone line for each of its sides, a relay in each box, means for energizing each relay when a coin is inserted in its box, a coin holding arm in each box adapted to be moved to prevent a coin from operating said box, a busy light in a circuit in each box, normally open contacts in said circuit, a second relay in each box for moving the holding arm and closing the contacts of the busy light circuit, and means in each box controlled by the energized first relay thereof for energizing the second relays of the other boxes to move their holding arms to render them inoperative and to close the contacts to put the busy light on.

6. In a selective telephonic music distributing system, a central station and at least one remote station, a control unit in the remote station, a telephone line connecting the control unit and the central station, means for normally maintaining a D. C. voltage on the line, a plurality of coin-operated call boxes connected to the control unit, a loud-speaker connected to the control unit, a microphone-speaker in each box, a microphone-speaker at the central station, a talk-listen circuit between the control unit and the central station microphone-speaker including the telephone line in one side and a ground return in the other, a signalling circuit from the control unit to the central station including the telephone line in one side and a ground return in the other, a music circuit from said loud-speaker to the central station including a conductor of the telephone line for each of its sides, a relay in a circuit in each box, a pair of normally-closed contacts in each of said circuits, means for energizing each relay when a coin is inserted in its box, an electronic tube in the control unit, a relay in circuit with said tube for holding said contacts together when it is energized, means connecting the grid of the tube to the telephone line, and means in the central station for applying a relatively high voltage to the line to bias the tube and stop the current flow therethrough, thereby permitting the contacts to separate and de-energize the first relay.

7. Apparatus according to claim 6 in which the means in the central station for applying a relatively high voltage to the telephone line consists of a power source, connected to the line, a pair of normally-open contacts between said source and the line, a relay for controlling said contacts, a power source connected to one end of the relay coil, a time constant resistor and condenser connected to the opposite end of said coil, and a switch between the power supply and the relay.

8. In a selective telephonic music distributing system, a central station having a pick-up for recorded music and a microphone-speaker, at least one station remote from the central station and connected thereto by a two conductor telephone line, a microphone-speaker at the remote station, a D. C. signalling circuit from the remote station to the central station including the telephone line in one side and a conductor other than a conductor of the telephone line in the other, an A. C. talk-listen circuit from the microphone-speaker at the remote station to the microphone-speaker at the central station including the telephone line in one side and said conductor other than a conductor of the telephone line in the other, an A. C. music circuit from the music pick-up at the central station including a conductor of the telephone line for each of its sides for music to be heard at the remote station, means operative from the remote station to signal the central station over the D. C. signalling circuit, and means operative from the central station to control use of the A. C. talk-listen circuit.

9. Apparatus as defined in claim 8 in which the conductor other than a conductor of the telephone line is a ground return.

10. Apparatus as defined in claim 9 including a loud-speaker at the remote station connected to the music circuit for reproducing the music to be heard at the remote station.

11. Apparatus as defined in claim 10 in which the A. C. music circuit from the music pick-up at the central station to the loud-speaker at the remote station comprises, in addition to amplifying means, a coil of a transformer at the central station, another coil of said transformer, the conductors of the telephone line, the coil of a transformer at the remote station, another coil of the remote station transformer, and the loud-speaker; said apparatus including means at the remote station and at the central station to connect one side of each of the D. C. signalling circuit and of the A. C. talk-listen circuit through the telephone line between the transformers so that the currents flowing in that side of the D. C. signalling circuit and of the A. C. talk-listen circuit are substantially balanced between the conductors of the telephone line.

12. Apparatus as defined in claim 11 in which the means at the remote station and at the central station to connect one side of each of the D. C. signalling circuit and of the A. C. talk-listen circuit through the telephone line comprises a centre-tap of each of the coils of the central and remote station transformers which is connected to the telephone line.

GEORGE PORTER ELLIS.

REFERENCES CITED

The following references are of record in the file of this patent:

UNITED STATES PATENTS

| Number | Name | Date |
|---|---|---|
| 2,264,911 | Shyvers | Dec. 2, 1941 |
| 2,291,115 | Stark | July 28, 1942 |
| 2,297,085 | Triman | Sept. 29, 1942 |
| 2,306,654 | Triman | Dec. 29, 1942 |
| 2,312,680 | Stone | Mar. 2, 1943 |